United States Patent [19]

Graetz et al.

[11] 4,390,658

[45] Jun. 28, 1983

[54] COATING COMPOSITIONS

[75] Inventors: Clive W. Graetz, Glen Waverly, Australia; Morice W. Thompson, Cox Green; Charles Bromley, Bourne End, both of United Kingdom

[73] Assignees: Imperial Chemical Industries Limited, London, England; Dulux Australia Limited, Victoria, Australia

[21] Appl. No.: 199,640

[22] Filed: Oct. 22, 1980

[30] Foreign Application Priority Data

Oct. 22, 1979 [GB] United Kingdom ................. 7936556

[51] Int. Cl.$^3$ .............................................. C08L 1/34
[52] U.S. Cl. ..................................... 524/512; 524/510
[58] Field of Search .............. 260/29.4 UA, 29.6 WA; 525/163; 529/512, 510

[56] References Cited

U.S. PATENT DOCUMENTS

| | | | |
|---|---|---|---|
| 3,707,584 | 12/1972 | Tulacs | 260/851 |
| 3,736,284 | 5/1973 | Fitko | 260/29.4 UA |
| 3,919,154 | 11/1975 | Chang et al. | 260/29.4 UA |
| 3,928,273 | 12/1975 | Chang et al. | 260/29.4 UA |
| 3,959,202 | 5/1976 | Blank | 260/29.4 UA |
| 3,960,983 | 6/1976 | Blank | 260/839 |
| 3,992,338 | 11/1976 | Noyes | 260/21 |
| 3,996,177 | 12/1976 | Ludwig | 260/29.4 UA |
| 4,106,421 | 8/1978 | Haag et al. | 113/120 A |

*Primary Examiner*—Joseph L. Schofer
*Assistant Examiner*—Bernard Lipman
*Attorney, Agent, or Firm*—Cushman, Darby & Cushman

[57] ABSTRACT

A crosslinkable coating composition is described which is miscible in all proportions with water and consists of crosslinked water-insoluble polymer microparticles sterically stabilised in dispersion in a liquid blend of a water-soluble crosslinking agent and a water-soluble, non-volatile substance of molecular weight less than 1000 which can take part in the crosslinking reaction but does not dissolve or swell the polymer, the amounts of the crosslinking agent and of the water-soluble non-volatile substance being up to 30% and 40% respectively of the total weight of film-forming material.

9 Claims, No Drawings

COATING COMPOSITIONS

This invention relates to water-reducible crosslinkable coating compositions having improved application properties and a reduced potential to cause atmospheric pollution on curing, requiring a lower input of energy to effect cure and being susceptible of formulation at high film-forming solids contents without incurring a penalty of high viscosity.

It has been proposed in British patent specification No. 1,523,617 to formulate a water-dispersible composition of matter of thermosetting type which is free from the presence of any volatile organic solvent and so has a reduced pollution potential. The composition comprises a specified non-ionic polyether polyol resin containing both hydrophobic and hydrophilic moieties, a water-dispersible non-gelled anionic vinyl polymer having pendant carboxyl groups, and a compatible aminoplast crosslinking agent. In this composition, however, in common with many other known water-borne coating compositions containing vinyl polymers, the water-dispersibility of the non-gelled vinyl polymer is achieved by the expedient of full or partial neutralisation of ionisable carboxyl groups carried by the polymer chains with ammonia or water-soluble amines. The composition is on this account not completely non-polluting, since on stoving, after application to a substrate, it releases the ammonia or amine into the atmosphere. In addition, the presence in such a water-borne coating composition of ionised species brings with it certain disadvantages, notably a tendency to water-sensitivity in the derived coating films.

We have now devised a class of water-reducible, thermosetting coating compositions which are free from any tendency towards atmospheric pollution on stoving, both on account of their being based on an aqueous medium not containing any volatile organic solvent and on account of the fact that the film-forming polymer is maintained therein in a state of particulate dispersion by means of a steric stabilisation mechanism.

According to the present invention there is provided a crosslinkable coating composition which is miscible in all proportions with water, the film-forming material in which consists of:

(A) crosslinkable, water-insoluble film-forming acrylic polymer particles of size less than 10 microns which are sterically stabilised in dispersion in a liquid blend of:

(B) at least one water-soluble crosslinking agent for the film-forming polymer, with (C) at least one water-soluble, non-volatile substance of molecular weight less than 1000 which is capable of participating in the reaction whereby the film-forming polymer is crosslinked but which does not appreciably dissolve or swell the particles of the said polymer, the amount of the crosslinking agent (B) being up to 30% of the total weight of the constituents (A), (B) and (C) and the amount of the non-volatile reactive constituent (C) being up to 40% of the said total weight.

If desired, the composition may also contain a proportion of water, as discussed further below.

The compositions of the invention thus consist of a disperse phase constituted by the film-forming polymer particles (A), and a continuous phase comprising the water-soluble crosslinking agent (B), the water-soluble co-reactive substance (C) and (if present) water.

Suitable crosslinkable film-forming acrylic polymers (A) are polymers or copolymers predominantly of esters of acrylic or methacrylic acids which contain functional groups which can react with the crosslinking agent (B), usually at an elevated temperature, after application of the composition to the substrate, so that the polymer becomes crosslinked. Examples of suitable functional groups are hydroxyl and carboxyl groups.

Suitable acrylic monomers which contain the requisite functional groups include hydroxyethyl acrylate, hydroxyethyl methacrylate, hydroxypropyl acrylate, hydroxypropyl methacrylate, hydroxybutyl methacrylate and the acrylic or methacrylic acid monoesters of polyols such as glycerol and trimethylolpropane; acrylic acid and methacrylic acid; acrylamide, methacrylamide, dimethylaminopropylacrylamide, dimethylaminopropylmethacrylamide, N-butoxymethyl acrylamide, N-butoxymethyl methacrylamide and the corresponding N-isobutoxy compounds. Normally the film-forming polymer will not be derived exclusively from such functional monomers but will be a copolymer of one or more of those monomers with other copolymerisable monomers, in particular with other acrylic monomers not containing cross-linkable functional groups such as methyl methacrylate, ethyl methacrylate, butyl methacrylate, lauryl methacrylate, ethyl acrylate, butyl acrylate, 2-ethylhexyl acrylate, dimethylaminoethyl acrylate, dimethylaminoethyl methacrylate, acrylonitrile and methacrylonitrile. The compolymers may also contain copolymerisable monomers not of the acrylic type, for example styrene, vinyltoluene, p-dimethylaminostyrene, vinyl acetate and vinyl propionate; such monomers may optionally contain crosslinkable functional groups, as, for example, itaconic acid and maleic anhydride.

The functional monomers will normally constitute from 2% to 25% by weight of the total monomers from which the film-forming polymer is derived, preferably from 5% to 15% by weight of that total.

The particles of the film-forming polymer (A) are, as already stated, sterically stabilised in dispersion in the liquid blend of the crosslinking agent (B) and the co-reactive substance (C). By this is meant that the polymer particles are associated with a dispersing agent which has the ability to form a barrier or sheath surrounding each particle, consisting of extended chains of a different polymer. The presence of this steric barrier prevents gross flocculation or aggregation of the particles. The dispersing agent is amphipathic in nature, that is to say it contains in the molecule two essential components of differing characteristics: one component is a polymer chain which is solvated by the liquid blend of the crosslinking agent (B) and the co-reactive substance (C), while the other component is a polymer chain which is not solvatable by that blend and which in consequence anchors itself to the disperse polymer particles.

The water-reducible nature of the compositions of the invention means that it is possible to employ, as the polymer particles (A), such particles which have been prepared as a sterically stabilised dispersion in an aqueous medium, whether or not the water present in that dispersion becomes part of the ultimate coating composition. Sterically stabilised aqueous dispersions of polymers may be produced in a number of ways. A preferred method is by polymerisation of the appropriate monomers in an aqueous medium in which the monomers are soluble but the resulting polymer is insoluble, in the presence of an amphipathic dispersing agent as defined above of which one component is solvatable by the aqueous medium. Such a procedure, and modifications thereof, are described in British patent applications Nos. 7,847,585, 7,921,091, 7,924,872 and 7,940,088. The aqueous medium in which the polymerisation is carried out consists of water admixed with a volatile organic co-solvent, the mixture as a whole being capable of dissolving the monomers, most or all of which would be substantially insoluble in water alone. The procedure involves the additional requirement that the polymerisation be conducted at a temperature which is at least 10° C. higher than the glass transition temperature of the polymer which is to be formed, and in such a manner that at no time is there present a separate free monomer phase. The sterically stabilised dispersions which are obtained in this way are very suitable for the formulation of coating compositions according to the present invention, since it is possible to remove the organic co-solvent from them by distillation without impairing the stability of the polymer disperse phase, yielding a product in which the continuous phase consists solely of water.

Another method whereby sterically stabilised aqueous polymer dispersions suitable for use in the present invention may be made is described in British patent specification No. 1,544,335. This procedure, like that referred to above, utilises an amphipathic block copolymer dispersing agent but it differs from the first method in that the polymerisation of monomer is conducted in water alone, as a result of which the monomer is always present as a separate liquid phase.

An aqueous acrylic polymer dispersion or latex prepared as described above may be blended directly with the water-soluble crosslinking agent (B) and the water-soluble co-reactive substance (C). If desired, the blend may then be subjected to vacuum distillation so as to remove the water present, thus giving a coating composition of substantially 100% film-forming solids content. In this event, the component of the amphipathic dispersing agent which was formerly solvated by the water will become solvatable by the blend of (B) and (C) and will ensure the continued stability of the disperse polymer particles. Alternatively, the water from the original dispersion may be allowed to remain in the coating composition; in these circumstances, the composition may have a film-forming solids content of up to 90% by weight, depending upon the concentration of polymer in the original dispersion or latex. For many applications, the useful range of film-forming solids contents is from 50% to 70% by weight; however, compositions having film-forming solids contents below 50% are also of interest. Normally, the solids content will not be lower than 10% by weight.

As already stated, it is necessary that the disperse polymer (A) should be capable of becoming crosslinked by reaction with the crosslinking agent (B), but if desired the polymer may already be to some degree cross-linked during its preparation in dispersion. Normally such preliminary crosslinking is conveniently effected by including, in the monomer charge which is polymerised in order to form the polymer in question, a monomer which is polyfunctional with respect to the polymerisation reaction. Suitable polyfunctional monomers include allyl methacrylate, ethylene glycol dimethacrylate and divinylbenzene.

Preferably the disperse polymer (A) has a maximum particle size of 1 micron and, even more preferably, a maximum size of 0.5 micron.

The crosslinking agent (B) present in the composition of the invention may be any material which is soluble in, but chemically inert towards, water and which is capable of reacting with the functional groups present in the disperse polymer and is polyfunctional with respect to that reaction. Of particular interest are the water-soluble amino resins, that is to say those condensates of formaldehyde with amino compounds such as urea, melamine and benzoguanamine, or the lower alkyl ethers of such condensates, which are soluble in water and which are capable of reacting with functional groups such as hydroxyl, carboxyl, hydroxymethylamino and alkoxymethylamino groups. In general, the water-soluble members of this class of resin are those containing a high proportion of methylol or methoxymethyl groups.

Other suitable crosslinking agents include water-soluble phenol-formaldehyde resins and the so-called "glycoluril" resins marketed under the names "Cymel" 1171 and "Cymel" 1172 (Registered Trade Marks).

If desired, a mixture of two or more of the above crosslinking agents may be employed.

Preferably the crosslinking agent (B) amounts to from 5% to 20% of the total weight of the constituents (A), (B) and (C).

The water-soluble, non-volatile substance (C) may be any substance or mixture of substances of molecular weight less than 1000 possessing these characteristics which contains at least two functional groups capable of taking part in the crosslinking reaction between the film-forming polymer (A) and the crosslinking agent (B). By "non-volatile" we mean that the substance in question does not appreciably volatilise at the temperature at which the coating composition would normally be stoved following application to a substrate. The functional groups in the substance (C) may be identical with those in the polymer (A), but are not necessarily so, provided that they also can react with the cross-linking agent.

Preferably the substance (C) has a molecular weight less than 500. Typically it is a monomeric, or at most low oligomeric, substance which is preferably a liquid but may be a solid provided either that it is soluble in some other constituent of the composition which is itself a liquid or (in the case where a composition of 100% film-forming solids content is not required) that it is soluble in water to give a liquid solution of not less than 70% concentration by weight.

Examples of suitable water-soluble, non-volatile substances include the polyether polyols which are the condensates of polyhydric alcohols with ethylene oxide or mixtures of ethylene oxide with minor proportions of other alkylene oxides, such as glycerol condensed with 4, 6 or 8 mol. respectively of ethylene oxide, trimethylolpropane condensed with 4, 6 or 8 mol. respectively of ethylene oxide and 1:4 bis-(hydroxymethyl) cyclohexane condensed with 6 mol. of ethylene oxide. Other suitable hydroxy group-containing compounds are polyhydric alcohols themselves, bisphenol-A, carbohydrates such as sucrose, sorbitol and golden syrup and 2,2-dimethyl-3-hydroxypropyl 2,2-dimethyl-3-hydroxypropionate ("Ester Diol 204").

Preferably the amount of the substance (C) is from 10% to 30% of the total weight of the constituents (A), (B) and (C).

Optionally, the compositions of the invention may also contain one or more pigments, of the kind which are conventionally used in water-borne coating compositions. The pigments may be either organic or inorganic and may be either hydrophilic or hydrophobic. The proportion of pigment can vary widely according to the nature of the pigment and the end-use of the coating composition, but a ratio of pigment to binder (viz. the total film-forming material) of from 0.7:1 to 1.2:1 is typical for white compositions and a ratio of from 0.1:1 to 0.8:1 for coloured top-coat compositions and for primers. The pigments are conveniently dispersed in the coating composition with the aid of suitable dispersing agents. These may be of the ionic type such as are conventionally used in water-borne coating compositions, for example isobutylene/maleic anhydride copolymers, sodium hexametaphosphate, dioctyl sodium sulphosuccinate and sodium dodecylbenzenesulphonate. It is strongly preferred, however, that any pigment dispersant employed should exert its stabilising action upon the pigment particles by a steric mechanism rather than by a mechanism involving electrically charged species. The presence of ionisable groupings in conventional dispersants incorporated into the compositions detracts from the advantages to be gained from the steric mode of stabilisation of the particles of the film-forming polymer. Accordingly, therefore, the pigments are preferably dispersed with the aid of a dispersant which contains in the molecule three essential components: (i) a water-insoluble polymer backbone; (ii) one or more side-chains attached to the backbone derived from a water-soluble polymer; (iii) one or more polar groups, also attached to the backbone, which are capable of associating with the pigment particles. Examples of such dispersants include: a copolymer of styrene, 2-ethylhexyl acrylate, methacrylic acid and the methacrylic ester of methoxypolyethylene glycol, mol.wt. 650 with the weight percentage composition 21.3/15.4/4.1/59.2 respectively and a weight average molecular weight of about 37,000; a copolymer of styrene, 2-ethylhexyl acrylate, dimethylaminoethyl methacrylate and the methacrylic ester of methoxy polyethylene glycol, mol.wt. 650 with the weight percentage composition 21.4/15.3/4.0/59.3 respectively and a weight average molecular weight of 17,500; a copolymer of styrene, 2-ethylhexylacrylate, methacrylic acid and the methacrylic ester of methoxypolyethylene glycol, mol.wt. 2000 with the weight percentage composition 15.9/11.4/3.0/69.7 respectively and a weight average molecular weight of 21,200. These copolymers may be made by copolymerisation of the monomers in solution in a suitable solvent, such as methylethyl ketone, in the presence of an initiator such as azo-bis(isobutyronitrile) and, if desired, of a chain transfer agent such as primary-octyl mercaptan. It is necessary that any pigment dispersant employed should not interact in any way with the polymeric dispersant whereby the particles of the film-forming polymer (A) are stabilised, otherwise there is a risk that the stability of either those particles or the pigment particles, or both, may be impaired, with adverse effects upon the properties of the coatings obtained on application of the composition. Such interaction is usually manifested by a sharp rise in the viscosity of the pigmented composition as compared with the unpigmented material, and/or by loss of gloss in the final film.

In the case where the pigment already has the required primary particle size, a simple mixing with one or more of the other constituents of the composition may suffice to disperse it adequately. In other cases, it may be desirable to produce a millbase by grinding or milling the pigment with one or more of the said constituents, and then to blend the millbase with the remaining constituents. For this purpose, the pigment may be ground, for example, in a mixture of the crosslinking agent (B) and the water-soluble, non-volatile reactive substance (C), or alternatively in the aqueous dispersion of the film-forming polymer (A).

The compositions of the invention may also contain catalysts of conventional type for the crosslinking reaction between the constituents (A) and (B). Examples of such catalysts include p-toluenesulphonic acid and its morpholine salt, methanesulphonic acid, dodecylbenzenesulphonic acid, acid butyl maleate and acid butyl phosphate, and they may be present in an amount of from 0.1% to 2% by weight, based on the total film-forming solids in the coating composition.

Coating compositions according to the present invention possess a number of advantages arising from the incorporation of the water-soluble, non-volatile co-reactive substance (C). For example, they exhibit reduced foaming during application by roller coating methods and improved flow, with less tendency for "popping" to occur, during stoving, as compared with water-borne compositions not containing such a constituent. By virtue of the steric mode of stabilisation of the disperse polymer, the compositions are free from any tendency to release noxious amines on curing, and they show improved freeze-thaw stability and resistance to flocculation by adventitious introduction of ionic material, as compared with conventional compositions based on charge-stabilised polymer latexes. They can be formulated so that the sole volatile constituent which is driven off on stoving is water; furthermore, unlike many so-called "water-borne" finishes, they are infinitely dilutable with water so that any application equipment used can be cleaned by means of cold water alone. A further advantage of the compositions is that they can be crosslinked after application to a substrate at substantially lower stoving temperatures than those which are customarily used for water-borne thermosetting compositions. The use of the co-reactive constituent has the added feature that it enables compositions to be formulated which have high film-forming solids contents, typically in excess of 50% by weight and even as high as 100%, but which do not suffer the penalty of accompanying high viscosity such as is encountered if the solids content is increased by recourse either to disperse phase volume fractions approaching critical close packing or to the inclusion of high molecular weight constituents in solution.

The compositions may be applied to a substrate by any of the usual methods, such as brushing, rolling, spreading, spraying (including compressed air, airless and electrostatic methods), tumbling, curtain coating and roller coating. The coatings so applied are then caused to cure, to bring about the crosslinking of the film-forming polymer. In the majority of cases, this will involve a heating operation; depending upon the nature of the substrate, this may take place in the region of 80° C. for a period of 30 minutes or at around 160° C. for 1 minute. Provided, however, that the appropriate catalyst is employed, it is possible for cure to take place over an extended period of time at room temperature.

The compositions are suitable for a variety of applications, in particular as coatings for the industrial market for metal goods such as washing machines, refrigerators, caravans and cladding for factory buildings. They are also useful for painting automobile bodies, for coil coating and for can coating, the non-polluting nature of the compositions rendering them particularly attractive for the last-mentioned of these applications. Those compositions which are capable of being cured at room temperature or force-drying temperatures can in addition be employed for wood finishing.

The films so obtained exhibit an excellent combination of properties, such as mechanical strength and resistance to weathering and corrosion.

The invention is illustrated but not limited by the following Examples, in which parts and percentages are by weight unless otherwise stated.

EXAMPLE 1

(1) Preparation of Polymer Latices (A) A latex was prepared of a copolymer having the composition methyl methacrylate/butyl acrylate/hydroxy propyl methacrylate/N-butoxymethylacrylamide/methacrylic acid 48/39.5/5/5/2.5, the latex having a non-volatile content of 51%. The latex was prepared as follows:

To a 2-liter flask fitted with stirrer, thermometer, inert gas inlet and reflux condenser with provision for feeding ingredients into the returning distillate, there was charged:

| Charge A | |
|---|---|
| Distilled Water | 315 parts |
| Methanol | 500 parts |

There was then added the following mixture:

| Charge B | |
|---|---|
| Methyl methacrylate | 27 parts |
| Butyl acrylate | 23 parts |
| Methacrylate of methoxypolyethylene glycol, mol. wt. 2000, (92.5% non-vol) | 19 parts |
| Azodiisobutyronitrile | 1.0 part |

The contents of the flask were heated to reflux temperature (73° C.) for 30 minutes to form a seed dispersion of polymer. There was then commenced the dropwise feed into the returning distillate of the following mixture:

| Charge C | |
|---|---|
| Methyl methacrylate | 198 parts |
| Butyl acrylate | 163 parts |
| N—Butoxymethyl acrylamide (60% solution in 3:1 butanol:xylene) | 34 parts |
| Methacrylate of methoxypolyethylene glycol, mol. wt. 2000, (92.5% non-vol) | 16.0 parts |
| Hydroxypropyl methacrylate | 20.6 parts |
| Azodiisobutyronitrile | 6.7 parts |

The addition of Charge C occupied 3 hours. When this was complete, there was added in the same manner, over a period of 45 minutes, the following mixture:

| Charge D | |
|---|---|
| Methyl methacrylate | 41 parts |
| Butyl acrylate | 35 parts |
| N—Butoxymethylacrylamide (60% solution in 3:1 butanol:xylene) | 8 parts |
| Methacrylic acid | 2.7 parts |
| Hydroxypropyl methacrylate | 4.4 parts |
| Azodiisobutyronitrile | 1.3 parts |

One half-hour after this final feed was complete, there was added Charge E consisting of a further 0.8 g of azodiisobutyronitrile (dissolved in about 10 g of the distillate returning from the reflux condenser). Heating was thereafter maintained at reflux temperature for a further 30 minutes, and alcohol was finally removed by distillation to give a stable latex of 51% solids content.

(B) A second latex was prepared, in a similar manner to that described above, of a copolymer having the composition methyl methacrylate/butyl acrylate/N-butoxymethylacrylamide/methacrylic acid 51/40.5/6/2.5, the latex having a non-volatile content of 54.2%.

(C) A third latex was prepared, in a similar manner to that described in (A), of a copolymer having the composition styrene/methyl methacrylate/butyl acrylate/hydroxypropyl methacrylate/N-butoxymethylacrylamide/dimethylaminoethyl methacrylate 18/28/42/5.5/5.5/1, the latex having a non-volatile content of 52.0%.

(D) A fourth latex was prepared, in a similar manner to that described in (A), of a copolymer having the composition methyl methacrylate/ethyl acrylate/butyl acrylate/hydroxypropyl methacrylate/N-butoxymethylacrylamide 39.2/42.7/7.5/5.3/5.3, the latex having a non-volatile content of 50.5%.

(2) Preparation of Pigment Millbase

A mixture of silica/alumina-coated titanium dioxide (400 parts), a water-miscible hexa(methoxymethyl)-melamine (50 parts), the condensate of 1 mol. of 1:4-bis(-hydroxymethyl)-cyclohexane with 6 mols. of ethylene oxide (50 parts), water (60 parts) and a copolymer of styrene, 2-ethylhexylacrylate, methacrylic acid and the methacrylate of methoxypolyethylene glycol mol.wt. 500, in the weight proportions 21.3/15.4/4.1/59.2 (20 parts non-volatile) was ground in a ball mill with 1050 parts of ¼-inch steatite balls. After grinding for 24 hours, a fluid pigment dispersion was obtained having a particle size of less than 5 microns as measured by Hegman gauge.

(3) Preparation of Gloss Paint Compositions

With the millbase prepared as in (2) above (10 parts) there were blended sufficient of the latex (A) described in (1) above to provide a composition containing 6.25 parts of latex polymer.

The above procedure was repeated using a corresponding amount in turn of each of the latices (B), (C) and (D). Each of the four paint compositions thus obtained was then catalysed by the addition of 0.13 part of a 50% aqueous solution of p-toluenesulphonic acid (except that, in the case of the composition based on Latex (C), twice that amount of acid solution was used) and was then applied by drawdown to pretreated aluminium panels using a wire-wound or grooved applicator bar providing a dry film thickness of 25 microns. The films were then stoved in a fan-assisted oven maintained at such a temperature that the metal was raised to 193°–199° C. within one minute. On reaching this temperature, the panels were withdrawn and quenched in cold water. The paint film was then subjected to a series of standard mechanical tests, the results of which are shown in the table below.

| Paint based on Latex | Gloss, % (60° meter). | Pencil Hardness. | Reverse Impact, lb/sq. in. | T-Bend test. | Solvent resistance. (no. of acetone rubs). |
|---|---|---|---|---|---|
| A | 83 | H | >40 | 1 T | >30 |
| B | 69 | H | >40 | 1½ T | >30 |
| C | 80 | F | >40 | 1½ T | >30 |
| D | 83 | H | >40 | 1½ T | >30 |

The paint composition having the highest solids content at application was that based on Latex B; it was calculated to be 69% by weight and 56% by volume.

EXAMPLE 2

(1) Preparation of Polymer Latex

A latex was prepared, in a similar manner to that described in Example 1 above, of a copolymer having the composition methyl methacrylate/butyl methacrylate/2-ethylhexyl acrylate/hydroxypropyl methacrylate/N-butoxymethylacrylamide 35/28/24/8/5; the latex had a non-volatile content of 54.5%.

(2) Preparation of Pigment Millbase

A millbase was prepared in the manner described in Example 1(2) except that the amount of water used was reduced to 35 parts.

(3) Preparation of a high solids, low curing energy Paint Composition

The millbase obtained as in (2) above (10 parts) was blended with the latex obtained as in (1) above (9.3 parts), the condensate of 1 mol. of 1:4-bis(hydroxymethyl)-cyclohexane with 6 mols. of ethylene oxide (1.25 parts) and the melamine-formaldehyde resin described in Example 1(2) (0.42 part).

The paint composition so obtained was catalysed by the addition of 0.18 parts of a 50% aqueous solution of p-toluenesulphonic acid and was then applied to a pretreated aluminium panel by grooved applicator bar as in Example 1(3). The panel was stoved to a metal peak temperature of 149°–154° C. by placing it in an oven maintained at 185° C. for one minute. Even with this relatively mild curing schedule, the paint film obtained withstood 45 acetone rubs, indicating that it was fully cured. The paint composition had a solids content of 74% by weight (61% by volume).

EXAMPLE 3

Preparation of a low gloss paint composition

The millbase prepared as described in Example 1(2) (8.9 parts) was blended with a latex (11.6 parts) similar to that described in Example 1(1) (D), except that it had a non-volatile content of 51.5%. The gloss of the composition so obtained was reduced by the addition of a 23% dispersion in water of a finely divided silica (5.5 parts) to the paint (94.5 parts). The resulting paint was applied to substrates as follows:

(a) To hot-dip galvanised steel pretreated with "Bonderite" 1303 ("Bonderite" is a Registered Trade Mark of Pyrene Co. Ltd), there was applied in acrylic water-borne primer and this was stoved so as to give a film of 5 microns thickness. The low-gloss paint was then applied by grooved bar as in Example 1(3) and stoved to complete cure at a metal peak temperature of 193°–199° C. A film of thickness 23 microns was obtained which had a gloss of 30% when measured on a 60° meter. The coating had good mechanical properties, passing the ⅛-inch bend test without cracking; it also passed the pencil hardness test (grade F) and withstood an impact of 90 lb/sq.in. with no "pick-off".

(b) Cold rolled steel pretreated with "Bonderite" 901 (Registered Trade Mark) was coated with primer as in (a). A thick film of the low-gloss paint was applied by grooved bar as in Example 1(3) and stoved to complete cure at a metal peak temperature of 193°–199° C. A total film thickness of 23 microns was obtained, with a gloss of 30% when measured on a 60° meter. The film was solvent resistant, had good adhesion, flexibility and hardness.

EXAMPLE 4

This Example shows the effect of latex polymer particle size on pigment utilisation and film gloss.

(1) Preparation of Polymer Latices

Two latices were prepared, in a similar manner to that described in Example 1(1), a copolymers both having the composition methyl methacrylate/ethyl acrylate/butyl acrylate/hydroxypropyl methacrylate/N-butoxymethylacrylamide 39.2/42.7/7.5/5.3/5.3. Latex (A) had a non-volatile content of 51.5% and a maximum particle size of 8 microns; latex (B) had a non-volatile content of 55% and a maximum particle size of 1 micron.

(2) Preparation of Paint Compositions

Compositions were prepared by blending 12.8 parts of latex (A) and 12.0 parts of latex (B) respectively each with 10 parts of the millbase obtained as described in Example 1(2). Each composition was catalysed by the addition of 0.07 part of p-toluene sulphonic acid and was then applied to aluminium panels using a grooved bar as in Example 1(3) and stoved to a metal peak temperature of 193°–199° C.; the gloss of the films obtained was measured on a 60° meter. The two paint compositions were also applied to glass panels at various film thicknesses and stoved for 30 minutes at 150° C. Scatter coefficients were determined on these films and also, for comparison, upon films prepared under identical conditions from commercially available paints.

The gloss of the film prepared from the paint containing latex (A) was only 28%; that of the corresponding film based on latex (B) was 73%. The scatter coefficient results are shown in the following table:

| Paint | Pigment/ binder ratio | $R_\infty$ | Scatter co-efficient (cm$^{-1}$) | Standard Deviation |
|---|---|---|---|---|
| As above using Latex (A) | 0.8:1 | 92 | 1627 | 49 |
| As above using Latex (B) | 0.8:1 | 91.5 | 2040 | 135 |
| As above using Latex (B) | 1.16:1 | 99.2 | 2722 | 52 |
| Commercial non-aqueous soln. acrylic | 1.16:1 | 88.8 | 2974 | 263 |

-continued

| Paint | Pigment/binder ratio | $R_\infty$ | Scatter co-efficient (cm$^{-1}$) | Standard Deviation |
|---|---|---|---|---|
| Commercial aqueous soln. polyester | 0.83:1 | 89.5 | 1750 | 189 |

The above results illustrate the effectiveness of fine particle-size polymer latices in achieving high film gloss and pigment efficiency.

EXAMPLE 5

This Example illustrates the use of two carbohydrate materials as the water-soluble, non-volatile substance (C).

(1) Preparation of Millbases

Two millbases were prepared as described in Example 1(2) but replacing the 1:4-bis(hydroxymethyl)-cyclohexane/ethylene oxide condensate with equal solids weights of golden syrup and of a 90% aqueous solution of sorbitol, respectively.

(2) Preparation of Paint Compositions

Each of the millbases prepared in (1) above (6.28 parts) was blended with a latex (10 parts) of a polymer having the same composition as that described in Example 1(1) (D) but with a non-volatile content of 50.1%. Each paint so obtained was catalysed by the addition of 0.05 part of p-toluene sulphonic acid and was applied to pretreated aluminium panels using a grooved bar as in Example 1(3). The resulting films were stoved to a metal peak temperature of 193°–199° C. and were tested with the following results:

| Paint | Pencil Hardness | Bend Test | Acetone rub test | Reverse impact (lb/sq. in.) |
|---|---|---|---|---|
| Incorporating golden syrup | 2H | 1T | >30 | 100 |
| Incorporating sorbitol | 2H | 1T | >30 | 80 |

EXAMPLE 6

A millbase (10.5 parts) prepared as described in Example 1(2) was blended with a latex (12.2 parts) similar to that described in Example 1(1) (D) except that it had a non-volatile content of 54.1%. The paint so obtained was catalysed by the addition of 0.07 part of p-toluene-sulphonic acid and was applied to hot dipgalvanised steel panels pretreated with "Bonderite" 1303 and coated with a non-aqueous solution-type epoxy resin primer. The finish was stoved to attain a metal peak temperature of 193°–199° C. in less than one minute. On reaching this temperature, the panels were quenched in cold water. The panels were then subjected to humidity and salt spray corrosion tests (B.S. 3900 and A.S.T.M. B117-64), together with panels similarly coated using commercially available non-aqueous solution acrylic and water-borne acrylic paints.

The results of the humidity tests indicated that the paint according to the present invention was as effective as the non-aqueous solution acrylic paint after 1000 hours' exposure, while the commercial water-borne paint failed within 200 hours. The results of the salt spray tests showed the paint according to the invention to be slightly inferior in performance to the non-aqueous solution acrylic paint but it was much superior to the commercial water-borne paint (it showed less corrosion after 1000 hours' exposure than the commercial paint did after 260 hours).

EXAMPLE 7

(1) Preparation of a siliconised polymer latex.

A latex was prepared of a copolymer having the composition methyl methacrylate 31%, butyl methacrylate 14%, ethyl acrylate 31%, butyl acrylate 13%, 2-hydroxypropyl methacrylate 5.5% and N-butoxymethylacrylamide 5.5%, the polymer being modified to the extent of 20% by reaction of a silicone intermediate with the hydroxyl groups present.

The latex was prepared as follows:

To a 2-liter flask fitted as described in Example 1(1), there was charged the following:

| Charge A | |
|---|---|
| Distilled Water | 215 g |
| Methanol | 112 g |
| Ethanol | 95 g |

To this was added the following mixture:

| Charge B | |
|---|---|
| Methyl methacrylate | 12 g |
| Butyl methacrylate | 5 g |
| Ethyl acrylate | 12 g |
| Butyl acrylate | 4 g |
| Methacrylate of methoxypolyethylene glycol, mol. wt. 2000 (92.5% non-vol) | 8 g |
| Azodiisobutyronitrile | 0.9 g | and the batch was heated for 30 minutes at reflux temperature (76° C.) to form a seed dispersion of polymer. There was then begun the dropwise addition, into the returning distillate, of the following mixture:

| Charge C | |
|---|---|
| Methyl methacrylate | 112 g |
| Butyl methacrylate | 51 g |
| Ethyl acrylate | 112 g |
| Butyl acrylate | 48 g |
| 2-Hydroxypropyl methacrylate | 21 g |
| N—Butoxymethylacrylamide (60% solution in 3:1 butanol/xylene) | 24 g |
| Methacrylate of methoxypolyethylene glycol, mol. wt. 2000 (92.5% non-vol) | 10 g |
| Azodiisobutyronitrile | 5 g |

Three-quarters of Charge C was added over a period of 4 hours: there was then added to the remaining one-quarter of Charge C the following Charge D, and the mixture was fed dropwise into the returning distillate over a period of 1½ hours:

| Charge D | |
|---|---|
| Silicone intermediate QP8-5314 (ex. Dow Corning Inc.) | 180 g |
| N—Butoxymethylacrylamide | |

-continued

| Charge D | |
|---|---|
| (60% solution as above) | 12 g |

After this last addition was completed, the batch was heated at reflux temperature for a further 30 minutes, after which there was added (Charge E) lg of azodiisobutyronitrile. Following a final period of 1 hour at reflux temperature, the batch was vacuum-stripped to give a 58% solids stable dispersion of polymer.

(2) Preparation of Paint Composition

The latex (10.4 parts) obtained as in (1) above was blended with a millbase (10 parts) obtained as described in Example 1(2). The paint was catalysed by the addition of 0.07 part of p-toluenesulphonic acid and was applied to aluminium panels using a grooved bar as in Example 1(3) and was cured under standard conditions as in that Example. The coating was then exposed to accelerated weathering conditions, using an Atlas XWR machine. There was no significant chalking during 200 hours' exposure, whereas coatings from a commercial non-aqueous solution-type acrylic paint and from a commercial water-borne acrylic paint both showed severe chalking in the same test after only 65 hours.

EXAMPLE 8

A polymer latex as described in Example 1 (1) (A), was subjected to vacuum in order to remove volatile diluent and so raise its non-volatile content to 65.7%. This concentrated latex (475 parts) was blended with a millbase (500 parts) obtained as described in Example 1(2), together with a 50% aqueous solution of p-toluenesulphonic acid (6.5 parts) and distilled water (80 parts). The resulting paint had a viscosity of 1.5 poise and a solids content of 70%.

The paint was run on a reverse roller coater for 1½ hours without any detrimental effects such as foaming or drying and caking on the rollers. By this method, the paint was applied to metal at various operating speeds and was afterwards cured to produce films of good gloss and mechanical properties. The settings which gave the best flow conditions were found to be (i) a traction speed of 100 ft/min. coupled with an applicator speed of 140 ft/min. and (ii) a traction speed of 120 ft/min. coupled with an applicator speed of 160 ft/min. During operation of the machine, the ambient atmosphere was noted to be free from the solvent pollution which is normally encountered in applying coatings by this method. Subsequent cleaning of the machine was readily carried out using only cold water.

EXAMPLE 9

This Example and the one following illustrate the use of a latex polymer which is crosslinked during its perparation.

A reaction flask was fitted with thermometer, stirrer, provision for blanketing the contents with nitrogen and an up-and-over condenser system reconnected to the flask via a mixing chamber. The flask was heated in a water-bath. Monomer to be polymerised was fed by means of a pump at a controlled rate into the mixing chamber where, under operating conditions, it became diluted with returning distillate before entering the flask.

| (A) | Distilled water | 22.2 parts |
|---|---|---|
| | Methanol | 35.35 parts |
| | Methacrylic acid ester of methoxypolyethylene glycol, mol. wt. 1900 | 1.3 parts |
| (B) | Butyl acrylate | 1.6 parts |
| | Methyl methacrylate | 1.9 parts |
| | Azodiisobutyronitrile | 0.1 part |
| (C) | Allyl methacrylate | 0.5 part |
| | Methacrylic ester of methoxypolyethylene glycol, mol. wt. 1900 | 1.0 parts |
| | Butyl acrylate | 12.9 parts |
| | Methyl methacrylate | 12.6 parts |
| | Azodiisobutyronitrile | 0.4 part |
| (D) | Butyl acrylate | 3.9 parts |
| | Methyl methacrylate | 4.6 parts |
| | N—Butoxymethylacrylamide (60% solids solution) | 1.5 parts |
| | Azodiisobutyronitrile | 0.1 part |
| (E) | Azodiisobutyronitrile | 0.05 part |

Charge A was introduced into the flask, Charge B was added thereto and the mixture heated to reflux temperature (about 74° C.). After 1 hour a fine bluish-white dispersion of seed polymer particles had formed, and Charge C was then fed in via the pump over a period of 3 hours. When the addition was complete, refluxing was continued for a further 1 hour to ensure complete conversion of monomers and crosslinking of the polymer.

To the dispersion of polymer thus obtained, Charge D was then fed in via the pump, at the same temperature as before, over a period of 1 hour. The polymerisation mixture was then held at reflux temperature for a further hour with the final addition of Charge E. The mixture was thereafter allowed to cool, with stirring, to room temperature. There was obtained a stable latex of crosslinked polymer of the overall composition butyl acrylate 47.3%, methyl methacrylate 49.1%, N-butoxymethylacrylamide 2.3% and allyl methacrylate 1.3%. The latex had a solids content of 45.9%.

The above latex was used as a replacement for the latex (A) described in Example 1 above in the preparation of a gloss paint composition as described in part (3) of that Example, the amount of the latex taken being again sufficient to provide a composition containing 6.25 parts of latex polymer for each 10 parts of millbase. The paint composition obtained was catalysed and applied to an aluminium panel as previously described. Similar results were obtained to those recorded in Example 1.

EXAMPLE 10

The procedure described in Example 9 for preparing the latex was repeated, except that in Charge (D) the 1.5 parts of N-butoxymethylacrylamide were replaced by 1.0 part of N-butoxymethylacrylamide (60% solution) and 0.5 part of hydroxyisopropyl methacrylate. The latex polymer thus obtained had the composition methyl methacrylate 48.8%, butyl acrylate 47.1%, allyl methacrylate 1.3%, N-butoxymethylacrylamide 1.5% and hydroxyisopropyl methacrylate 1.3%. The latex had a solids content of 51.6%.

The above latex was used as a replacement for the latex (A) described in Example 1 above in the preparation of a gloss paint composition as described in part (3) of that Example, the amount of latex taken being sufficient to provide 6.25 parts of polymer for each 10 parts of millbase. The paint composition was catalysed and applied to an aluminium panel as previously described, with similar results to those recorded in Example 1.

EXAMPLE 11

A series of millbases was prepared as described in part 2 of Example 1, except that the 50 parts of the condensate of 1 mol. of 1:4-bis(hydroxymethyl)-cyclohexane with 6 mols. of ethylene oxide used therein were replaced by an equal weight (based on solids contents) of each of the following substances:

| | |
|---|---|
| (a) Condensate of 1:4-bis(hydroxymethyl)-cyclohexane (1 mol.) with ethylene oxide | (4 mols.) |
| (b) Condensate of 1:4-bis(hydroxymethyl)-cyclohexane (1 mol.) with ethylene oxide | (8 mols.) |
| (c) Condensate of trimethylpropane (1 mol.) with ethylene oxide | (6 mols.) |
| (d) Bisphenol A (1 mol.) with ethylene oxide | (10 mols.) |
| (e) "Ester Diol 204"* (1 mol.) with ethylene oxide | (8 mols.) |
| (f) "Ester Diol 204"* (1 mol.) with ethylene oxide | (10 mols.) |

*"Ester Diol 204" is 2,2-dimethyl-3-hydroxypropyl 2,2-dimethyl-3-hydroxypropionate.

Each of the above millbases in turn (10.5 parts) was blended with an acrylic latex similar to that described in part 1(B) of Example 1 except that it had a non-volatile content of 54.1%. The six paints so obtained were each catalysed by the addition of 0.07 parts of p-toluenesulphonic acid and were applied by drawdown on to pretreated aluminium panels using a wire-wound or grooved applicator bar providing a dry film thickness of 25 microns. The films were then stoved in a fan-assisted oven maintained at a temperature such that the metal was heated to 216°–224° C. within one minute. On reaching this temperature, the panels were withdrawn and quenched in cold water. The results of standard tests carried out on the painted panels are given in the table below.

| Paint based on millbase | Gloss (60% meter) % | Pencil Hardness | Reverse Impact (lb/sq. in) | T-bend test | Solvent resistance* |
|---|---|---|---|---|---|
| (a) | 78 | H | >40 | 1T | >50 |
| (b) | 86 | F | >40 | 1T | >50 |
| (c) | 79 | H | >40 | 1T | >50 |
| (d) | 70 | F | >40 | 1T | >50 |
| (e) | 78 | H | >40 | 1T | >50 |
| (f) | 76 | F | >40 | 1T | >50 |

*number of rubs with methyl ethyl ketone.

We claim:

1. A crosslinkable coating composition which is miscible in all proportions with water, the film-forming material in which consists of:
(A) crosslinkable, water-insoluble film-forming acrylic polymer particles of size less than 10 microns which are sterically stabilised in dispersion in a liquid blend of:
(B) at least one water-soluble crosslinking agent for the film-forming polymer, with
(C) at least one water-soluble, non-volatile substance of molecular weight less than 1000 which is capable of participating in the reaction whereby the film-forming polymer is crosslinked but which does not appreciably dissolve or swell the particles of the said polymer, the amount of the crosslinking agent (B) being up to 30% of the total weight of the constituents (A), (B) and (C) and the amount of the non-volatile reactive constituent (C) being up to 40% of the said total weight and the sterically stabilised aqueous dispersion of the acrylic polymer (A) being obtained by the polymerisation of monomers in an aqueous medium in which the monomers are soluble but the resulting polymer is insoluble, in the presence of an amphipathic dispersing agent which contains in the molecule as one component thereof as polymer chain which is solvatable by the liquid blend of the crosslinking agent (B) and the co-reactive substance (C) and as another component thereof a polymer chain which is not solvatable by that blend and which anchors itself to the particles of the polymer (A).

2. A composition as claimed in claim 1, wherein the acrylic polymer contains functional hydroxyl and/or carboxyl groups which can react with the crosslinking agent (B) after application of the composition to a substrate.

3. A composition as claimed claim 1, wherein the crosslinking agent (B) is a water-soluble amino resin.

4. A composition as claimed in claim 1, wherein the crosslinking agent (B) amounts to from 5% to 20% of the total weight of the constituents (A), (B) and (C).

5. A composition as claimed in claim 1, wherein the water-soluble, non-volatile substance (C) has a molecular weight less than 500.

6. A composition as claimed in claim 1, wherein the substance (C) is the condensate of a polyhydric alcohol with ethylene oxide or a mixture of ethylene oxide with minor proportions of other alkylene oxides.

7. A composition as claimed in claim 1, wherein the substance (C) amounts to from 10% to 30% of the total weight of the constituents (A), (B) and (C).

8. A composition as claimed in claim 1, additionally containing one or more pigments which are dispersed therein by means of a pigment dispersant which exerts its stabilising action upon the pigment particles by a steric mechanism and which contains in the molecule (i) a water-insoluble polymer backbone, (ii) one or more side-chains attached to the backbone derived from a water-soluble polymer; (iii) one or more polar groups also attached to the backbone which are capable of associating with the pigment particles.

9. A composition as claimed in claim 1, wherein there is also present a catalyst for the crosslinking reaction between the constituents (A) and (B), in an amount of from 0.1% to 2% by weight based on the total film-forming solids in the composition.

* * * * *